US008701126B2

(12) United States Patent
van Riel

(10) Patent No.: US 8,701,126 B2
(45) Date of Patent: Apr. 15, 2014

(54) ZERO-COPY NETWORK I/O FOR VIRTUAL HOSTS

(75) Inventor: Henri Han van Riel, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 370 days.

(21) Appl. No.: 12/771,234

(22) Filed: Apr. 30, 2010

(65) Prior Publication Data
US 2010/0211947 A1   Aug. 19, 2010

Related U.S. Application Data

(63) Continuation of application No. 11/161,491, filed on Aug. 5, 2005, now Pat. No. 7,721,299.

(51) Int. Cl.
*G06F 13/00* (2006.01)
(52) U.S. Cl.
USPC ............ 719/319; 718/1; 709/212; 709/216
(58) Field of Classification Search
USPC ................. 719/319; 718/1; 709/212, 216
See application file for complete search history.

(56) References Cited

U.S. PATENT DOCUMENTS

| 6,061,349 | A  | * | 5/2000  | Coile et al. ............... 370/389 |
| 6,725,289 | B1 |   | 4/2004  | Waldspurger et al. |
| 7,299,468 | B2 |   | 11/2007 | Casey et al. |
| 7,305,493 | B2 |   | 12/2007 | McAlpine et al. |
| 7,383,374 | B2 |   | 6/2008  | Yamada et al. |
| 7,739,684 | B2 | * | 6/2010  | Baumberger ............... 718/1 |
| 7,802,000 | B1 | * | 9/2010  | Huang et al. ............. 709/228 |
| 8,392,606 | B2 | * | 3/2013  | Banks et al. ............. 709/228 |
| 2005/0144422 | A1 | * | 6/2005  | McAlpine et al. ........ 711/206 |
| 2006/0034167 | A1 |   | 2/2006  | Grice et al. |
| 2006/0070065 | A1 |   | 3/2006  | Zimmer et al. |
| 2006/0224815 | A1 |   | 10/2006 | Yamada et al. |
| 2006/0294234 | A1 |   | 12/2006 | Bakke et al. |
| 2007/0088822 | A1 | * | 4/2007  | Coile et al. ............. 709/224 |

OTHER PUBLICATIONS

Paul Barham et al., "Xen and the Art of Virtualization", University of Cambridge Computer Laboratory, Oct. 19-22, 2003, Bolton Landing, New York, USA.

* cited by examiner

*Primary Examiner* — Andy Ho
(74) *Attorney, Agent, or Firm* — Lowenstein Sandler LLP

(57) ABSTRACT

Techniques for virtualized computer system environments running one or more virtual machines that obviate the extra host operating system (0/S) copying steps required for sending and receiving packets of data over a network connection, thus eliminating major performance problems in virtualized environment. Such techniques include methods for emulating network I/O hardware device acceleration-assist technology providing zero-copy I/O sending and receiving optimizations. Implementation of these techniques require a host 0/S to perform actions including, but not limited to: checking of the address translations (ensuring availability and data residency in physical memory), checking whether the destination of a network packet is local (to another virtual machine within the computing system), or across an external network; and, if local, checking whether either the sending destination VM, receiving VM process, or both, supports emulated hardware accelerated-assist on the same physical system. This optimization, in particular, provides a further optimization in that the packet data checksumming operations may be omitted when sending packets between virtual machines in the same physical system.

15 Claims, 11 Drawing Sheets

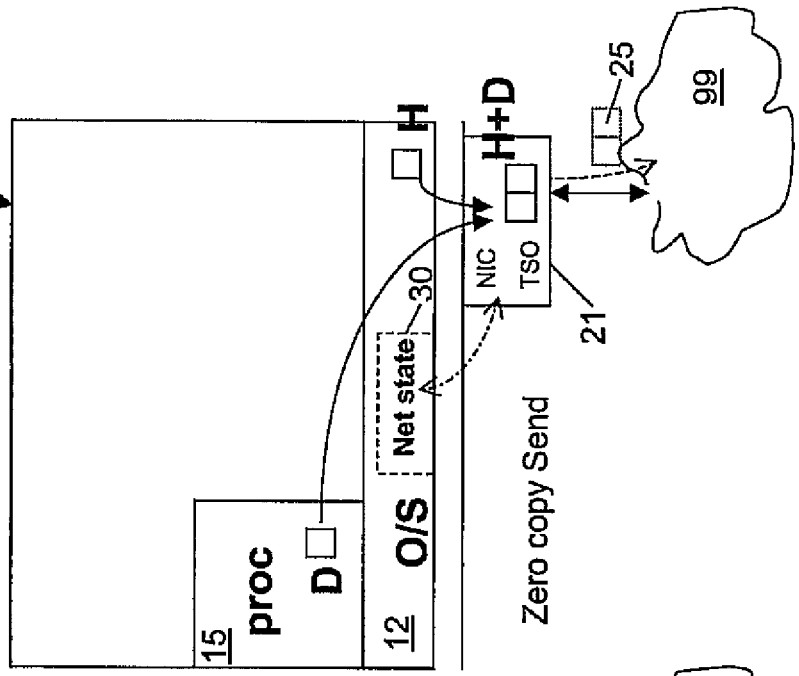
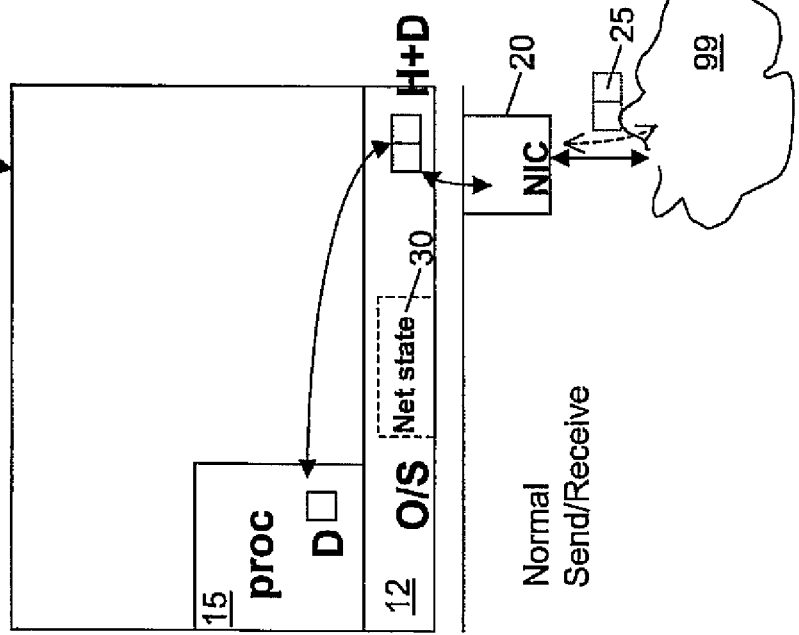

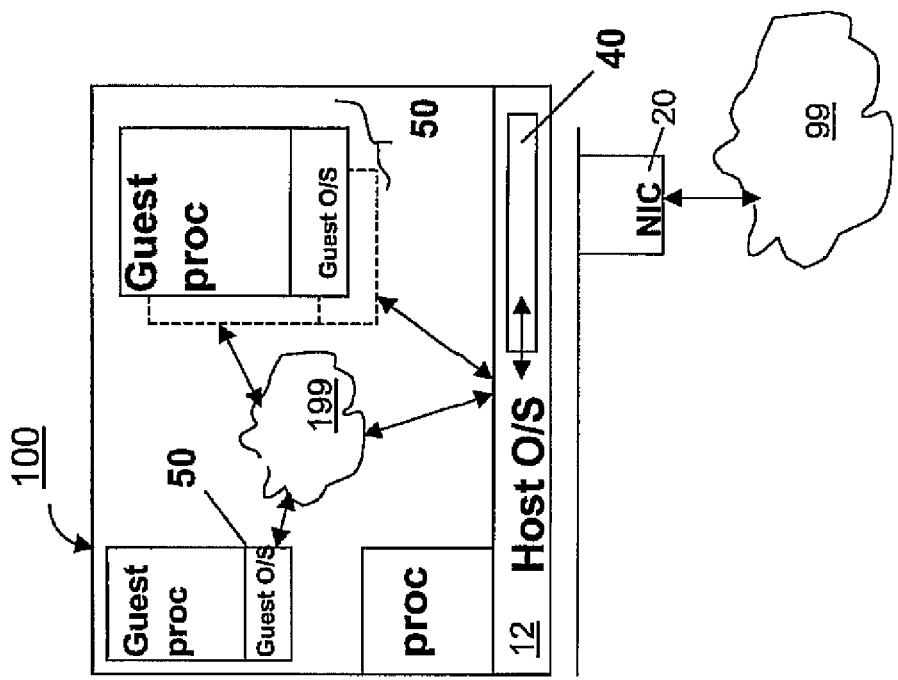
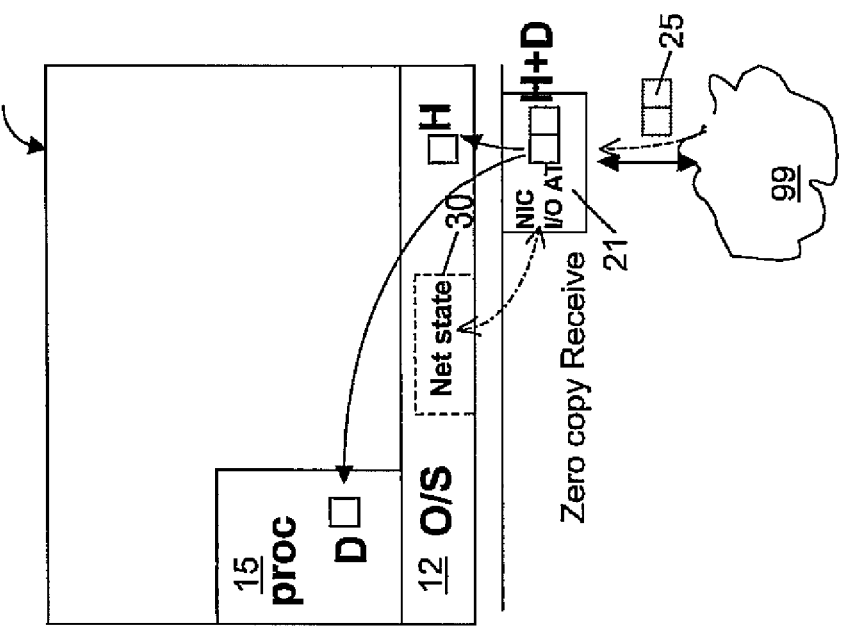

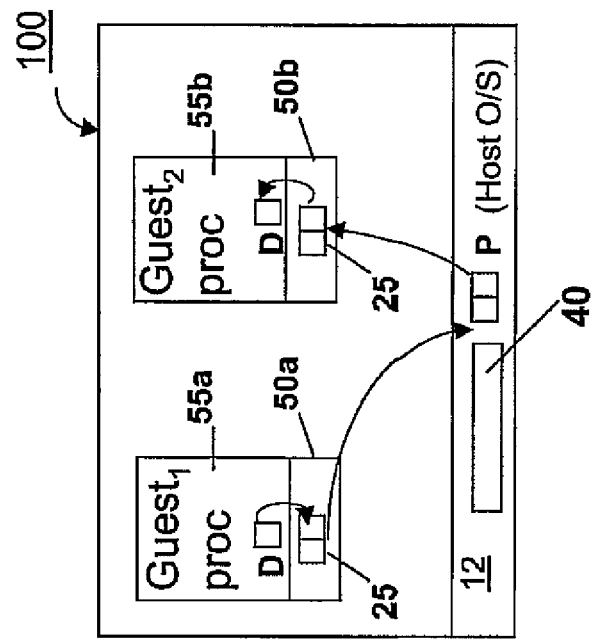
Figure 1(e) [Prior Art]
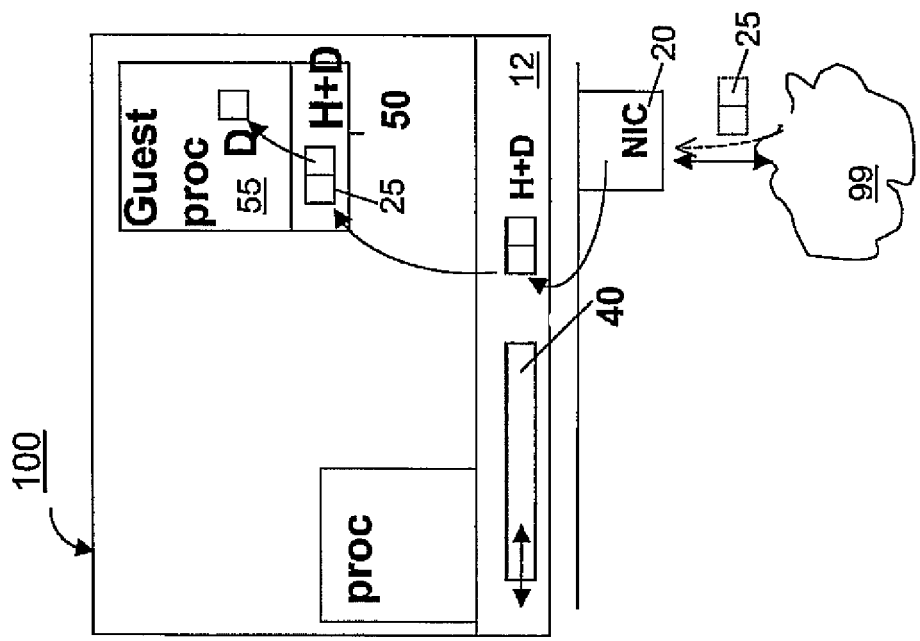
Figure 1(f) [Prior Art]

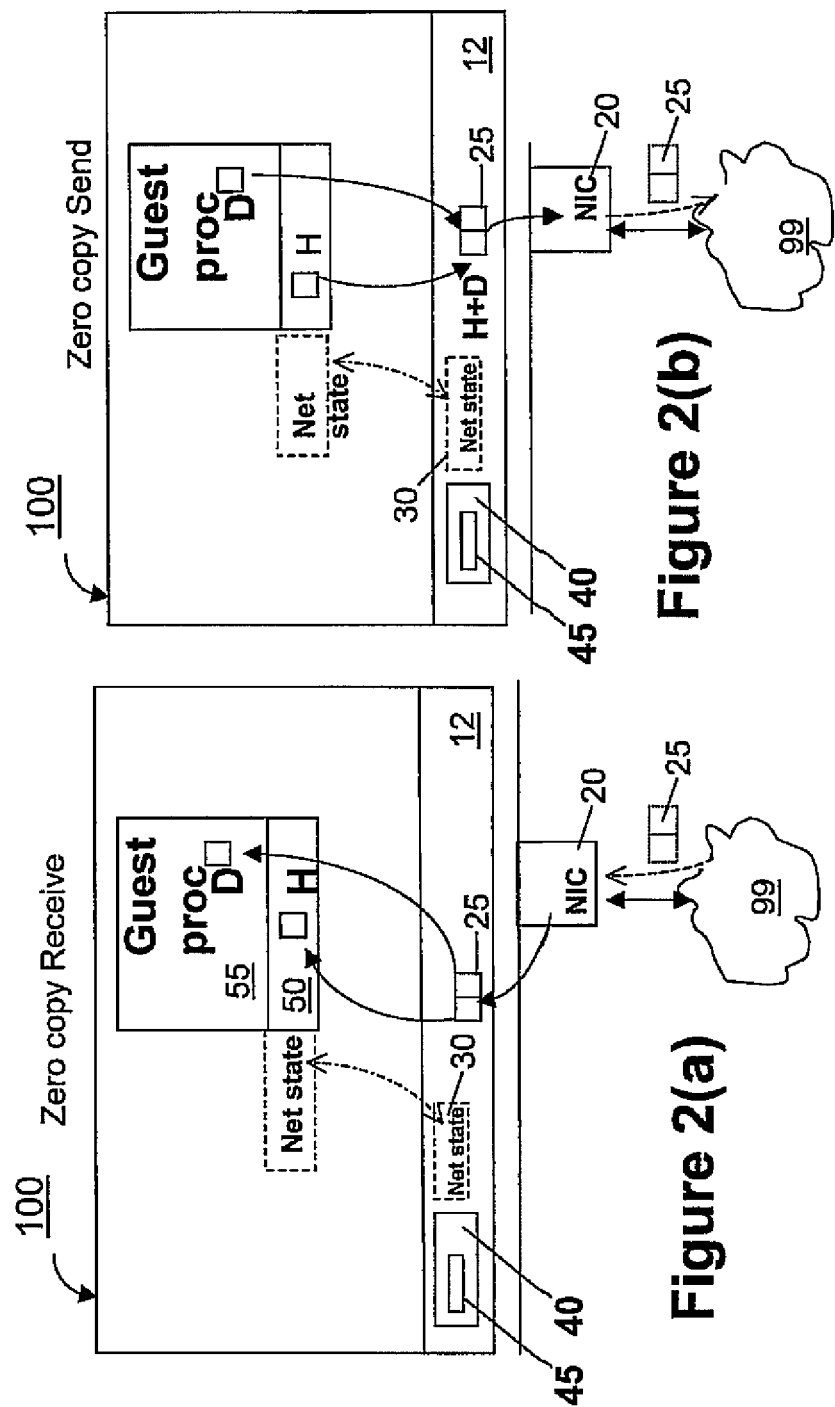

ZERO-COPY NETWORK I/O FOR VIRTUAL HOSTS

CROSS-REFERENCE TO RELATED APPLICATION

This application is a continuation of U.S. Patent App. No. 11/161,491, filed on Aug. 5, 2005 and issued as U.S. Pat. No. 7,721,229 on May 18, 2010, which is hereby incorporated by reference in its entirety.

FIELD

The present invention relates to a technique for increasing performance of virtualized computing environments and methods for enabling network communication I/O operations to virtual machines by eliminating of memory copies.

BACKGROUND OF RELATED ART

Traditionally, as shown in FIG. 1(a), a computer system 10 including a processor device (CPU) executes an Operating System (O/S) 12 natively on the computer hardware that is adapted for executing basic computer system functions in addition to controlling execution of one or more programs or processes 15. The computing system further includes two types of memory: a 'real' memory that comprises the actual physical memory (e.g., IC chips plugged into the computer) that is of a fixed size; and, a 'virtual' memory that is an abstraction provided by the O/S and memory management hardware (not shown), primarily for application usage. It is understood that part of virtual memory is backed (mapped) onto real memory, and may be part backed by non-volatile storage media, (e.g., one or more hard disk drives) allowing virtual memory size to exceed real (physical) memory size. A process 15 executing in the computer system 10 will thus have an associated virtual address space that is the logical view of how the process is stored in memory. The process may be located at a certain virtual address and may exist in contiguous memory. However, the corresponding physical memory may be organized according to a variety of memory organization schemes e.g., pages, frames, however, such entities assigned to a process may not be contiguous. The use of virtual memory thus requires implementation of the memory management hardware implementing a translation table or like memory mapping unit (not shown) that map program (virtual) addresses or pages to corresponding physical memory addresses or pages in real memory. It is a function of the O/S 12 to ensure that the data and process a program is currently using is resident in real physical memory, and that the translation table can map the virtual address to the real address correctly.

The traditional computing system shown in FIG. 1(a) is configured to receive and send network packet communications over computer network connections according to various communications protocols, e.g., connection protocol e.g., Transmission Control Protocol (TCP/IP); or, connectionless protocols, e.g., Domain Name Service (DNS) implementing User Datagram Protocol (UDP), for example. Typically the computing system is provisioned with a network interface card (NIC) 20 that is designed to provide for computer communication over a computer network 99, e.g., a local and wide area network, a private network, a public network such as the Internet. When a network packet 25 (comprising header and data portions) arrives at a NIC 20, the NIC moves the data into a pre-allocated location or buffer in the computer device's main memory.

Assuming that the network communications protocol (e.g., TCP, STCP, SCCP, TCP/IP) in use requires packet header checksums, the data may first be read so that it can be checksummed to ensure integrity of the communicated packet. As network state information 30 including the network connections established for receiving communications from the network is maintained at the 0/S, the 0/S determines from the header portion of the packet, the destination process of the received packet. Once the header (H) portion of the network packet has been fully processed and data checksums performed, the data (D) portion of the packet is then moved by the CPU into its final destination in memory for use by a receiving process 15, e.g., a web browser or other application. This final location may comprise a network I/O (socket) interface (the network communications end-point address). In all but the original move from the NIC to system memory, the CPU is responsible for moving the data providing a substantial processing overhead.

Likewise, using well known computer system 0/S and network I/O mechanisms, to send data over a network from an executing process 15, the computing system's 0/S will first receive a copy of the data (D) from the process and assemble one or more network packets 25 (each having header (H) and data (D) or payload portions) and perform a copy to the NIC 20 which forwards the packet over the network 99 according to a particular network protocol. Particularly, to write data to a network, an application will open a socket interface that represents an end point, and writes the data to the socket interface. The data goes through the network protocol stack, is modified by the 0/S (e.g., adding of protocol headers and/or breaking down into smaller packet segments) and is finally passed on to a driver representing the network interface controller (NIC) hardware. The NIC finally sends the data over the network.

More advanced NIC devices available today are enabled to perform the data packet assembly itself. By providing network interface control devices with network I/O hardware device acceleration-assist technology, hardware-assisted "zero-copy" sending and receiving functionality may be performed which reduces the load on system components. For example, TCP Segment Offload (TSO) and like technologies such as Intel Corp.'s I/O Acceleration Technology (I/OAT) may be implemented in a network interface card to enable increased throughput for many varieties of network traffic For a zero copy sending function, implemented in network I/O hardware device acceleration-assist technology enabled network card 21, as exemplified in FIG. 1(b), the 0/S informs an TSO-enabled network interface card 21 where to obtain the header (H) and data (D) from the physical memory. The hardware-assist provisioned network card 21, utilizing Direct Memory Access (DMA) mechanisms, then assembles the network packet 25. This process is referred to as "zero copy" sending, as a data copy to the 0/S has been eliminated. In some configurations, the hardware itself may calculate the IP and TCP checksums of the data so that the 0/S does not need to prepare those in the specified header portion of the packet. A switch in the network interface card implementing network I/O hardware device acceleration sets a flag or indicator informing the device driver that it can/cannot perform checksumming. If the operating system does not want the overhead of performing checksumming itself, it will inform the network card that it needs to perform checksumming computations for packets it will send.

As shown in FIG. 1(c), zero copy receiving works similarly by enabling a received packet 25 to be parsed by the hardware-assisted network card 21, which sends the header to (H) a predefined location in the 0/S. The 0/S, in response, is able to determine a target process which is to receive the data payload, and forwards the data (D) to a virtual memory address associated with that target process 15. In the case of connection based protocols, the O/S will know which packets are likely to arrive, and thus the NIC card may be programmed to give the data payload directly to the user process. To perform this network I/O acceleration, a subset of network state information 30 maintained by the O/S, e.g., connection status according to a particular communications network protocol such as Gigabit Ethernet and TCP/IP, is also maintained at the network card 21. Provision of such information enables it to more efficiently process the received packets. Moreover, for the DMA transfer to work, the O/S must ensure that those pages of the target process which are about to receive the data are resident in physical memory (i.e., there must be a physical memory address that the network card can write to).

It is the case that modern computers are powerful enough to support virtualization whereby the hardware of a single computer (e.g., CPU, memory disk drives, NIC, etc.) is abstracted into different execution environments, referred to as Virtual Machines (VMs). As shown in FIG. 1(d), enabling the virtualized computing environment 100, is the implementation of a virtualization layer 40, e.g., virtualization software such as provided by Vmware, Inc. of Palo Alto, Calif. or, Xen (University of Cambridge Computer Laboratory). Such software executes under control of the host O/S, such as Linux or Windows, and enables the host system 100 to run several "guest" operating systems 50 (guest O/Ses) as independent virtual machines. Using the virtualization software 40, a host O/S 12 creates an illusion that a guest process has its own processor with its own virtual memory, and additionally provides interfaces for the processes that are identical to the interfaces of the native hardware. While the virtualization software is depicted in FIG. 1(d) as running inside the host O/S, it is executable as a separate application outside and under the control of the host O/S. It is the case that the guest O/S and guest process may reside in virtual memory. Consequently, the guest O/S does not know where in physical memory the guest lives, or whether the virtual memory associated with the guest O/S is even represented in physical memory. Moreover, as shown in FIG. 1(d), a virtual network 199 of guest virtual machines may exist.

Currently, the network I/O acceleration techniques depicted in FIGS. 1(b) and 1(c) do not work in the virtualized environment 100 such as shown in FIG. 1(d). That is, special considerations must be taken into account when implementing network I/O hardware device acceleration-assist technology (e.g., accelerated TCP segment offload (T50) or other hardware assisted TCP) in virtualized environments. For example, as shown FIG. 1(e), for the case of receiving network packets 25 via the NIC card 21 without hardware assist implemented in a virtualized environment, the host operating system 12 must first receive the packet from the NIC, analyze the packet, and determine which destination guest is to receive the packet. The host O/S 12 must then send the packet to the guest O/S receive (kernel) buffer, which is one memory to memory copy. Once the guest O/S 50 receives the packet, the packet 25 must be analyzed to determine for which process 55 executing in the guest and socket buffer the data is and copies the data to the socket buffer of the right process, which is another memory to memory copy. As a result, virtualized network performance is not as good as network performance of the operating system running "natively" on the hardware.

Referring back to FIG. 1(d), in a virtual network 199 comprising a number of executing guest virtual machines (guest O/Ses 50 and corresponding processes) existing on computing system 100, these guest processes may communicate with the host O/S 12 and, further communicate with each other through the host O/S via virtual interfaces provided by the virtualization layer 40. Currently, as shown in FIG. 1(f), when a first guest process 55a associated with a first virtual machine 50a sends data to a second guest process 55b, the guest O/S on the sending side copies the data (D) into a network packet 25 that is formed by the first guest O/S (a first data copy operation). The network packet 25 is then sent to the host O/S 12 (a second data copy operation), and, subject to allowance after applying firewall rules by the host O/S, the packet 25 is sent to the receiving guest O/S (a third data copy), which then copies the data (D) to the destination receiving guest process 55b which requires a total of four copies of the data (and two packet header copies). As a result, high performance virtualized network performance is compromised.

In the case of Intel's I/OAT, network data is directly provided to a guest O/S kernel in some of the virtual machines on a system; however not directly into a userspace. That is, the data has to go to an unsorted buffer, from where the guest OS needs to do the final copy of the data. In operation, the I/OAT network hardware can "split" the traffic into a limited number of streams, if the network card has N streams, N−1 can be directed to guest virtual machines and one stream has to go to the host O/S, which then copies the data and headers to guest virtual machines. The host O/S can point the streams from the network card at those virtual machines that have the highest rate of network traffic and, can periodically reevaluate which virtual machines do the most network traffic, and decide to point some of the network streams at other virtual machines. As part of this technology, the headers and data of the packets can be sent into different buffers. The hardware further includes an asynchronous memory copying unit, so the host O/S could choose to: 1) receive all packets; 2) optionally, separate headers and data into different buffers; 3) process packets; 4) look for which virtual machine the packet is destined; 5) apply firewall rules; and, 6) have the mainboard chipset copy the data and header over to the virtual machine, while the CPU processes the next packet. Moreover, in this I/OAT technology, the host O/S can choose to copy the data to kernel buffers in the guest OS, but have the headers sent to itself, in order to apply firewall rules.

It would thus be highly desirable to provide a system, method and computer program product that extends network I/O hardware device acceleration-assist (e.g., TSO and like hardware-assist acceleration I/O) to virtualized environments so that full zero copy network receive and send functionality may be implemented in such virtualized environments and, for eliminating one or more data copies on hardware that does not implement TSO or other I/O hardware device acceleration-assist technology.

It would further be highly desirable to provide a system, method and computer program product that extends hardware device acceleration-assist technology to virtualized environments, whereby the virtualization software implemented at the host O/S emulates hardware accelerated network I/O operations enabling virtual machines present on the same computing system to communicate with the host and with each other without the overhead of excessive data copy operations.

It would further be highly desirable to provide a system, method and computer program product that extends hardware device acceleration-assist technology, e.g., TSO, to virtualized environments, providing full zero copy network sending on TSO and non-TSO enabled systems in virtualized environments; providing full zero copy network receiving on TSO enabled systems and eliminating one or more data copies on hardware not implementing TSO.

BRIEF SUMMARY

The present invention addresses the above and other issues by providing techniques for virtualized computing system environments that obviate the extra host O/S copying steps required for sending and receiving data over a network connection, thus eliminating major performance problems.

In one aspect of the invention, there is provided a system, method and computer program product that extends hardware device acceleration-assist technology to virtualized environments, whereby the virtualization software implemented at the host O/S emulates network I/O hardware accelerated-assist operations providing zero-copy packet sending and receiving operations for virtual machines. Such hardware accelerated-assist emulations enable virtual machines present on the same computing system to communicate over an external network, communicate with the host system and/or, communicate with each other, without the overhead of excessive data copy operations.

In extending hardware device acceleration-assist technology to virtualized environments, techniques are implemented that enable a host O/S to perform actions including, but not limited to: ensuring residency in physical memory of data to be read or copied at a virtual memory address of a guest process to enable direct host O/S access thereto by performing all the necessary address translations; checking whether the destination of a network packet is local (to another virtual machine within the computing system), or across an external network; and, if local, checking whether either the sending destination VM, receiving VM process, or both, supports emulated hardware accelerated-assist on the same physical system.

In one embodiment, a method for emulating hardware device acceleration includes identifying a network packet destined for a virtual process controlled by a guest operating system. The method further includes identifying a physical memory location corresponding to a virtual memory location utilized by the virtual process, and copying data from the network packet into the physical memory location corresponding to the virtual memory location.

In another embodiment, a method for emulating hardware device acceleration includes retrieving, from a first physical memory location, data to be included in a network packet, wherein the first physical memory location corresponds to a virtual memory location utilized by a virtual process controlled by a guest operating system. The method further includes retrieving, from second physical memory location, a header to be included in the network packet, wherein the second physical memory location corresponds to a kernel buffer location of the guest operating system, and combining the header and the data to form the network packet.

In another embodiment, a method for emulating hardware device acceleration includes receiving an indication of a network packet to be sent a destination, the network packet originating from a virtual machine executing on a computer system. The method further includes determining whether the destination of the network packet is a second virtual machine executing on the computer system, and transferring the network packet to the second virtual machine if the destination of the network packet is the second virtual machine.

Advantageously, the method and computer program product in various embodiments of the invention may be implemented in virtualized environments where the guest O/S may be either zero-copy sender or receiver aware (i.e., knows how to operate in conjunction with network I/O acceleration technologies).

Moreover, the method and computer program product of the invention may be implemented in virtualized environments providing functionality enabling a host O/S to enforce firewall rules for destination guest O/Ses, and may operate on both header or data portions of packets. That is, firewall rules may be applied specifying actions such as: forwarding of header and data portions of a network packet, dropping the packet; or modifying one of the data portion, the header portion or, both data and header portions of the packet.

Advantageously, the computer-implemented method that extends hardware device acceleration-assist technology to virtualized environments provides a further optimization in that packet data checksumming operations normally performed by a host O/S when communicating packets may be omitted when sending packets between virtual machines in the same physical system.

BRIEF DESCRIPTION OF THE DRAWINGS

These and other features, benefits and advantages of the present invention will become apparent by reference to the following text and figures, with like reference numbers referring to like structures across the views, wherein:

FIG. 1(a) illustrate a computer system architecture for implementing receive and send network I/O operations in a non-virtualized computing environment in accordance with the prior art;

FIGS. 1(b) and 1(c) illustrate a computer system architecture for implementing respective send and receive network I/O operations with I/O acceleration hardware in a non-virtualized computing environment in accordance with the prior art;

FIG. 1(d) illustrates a computer system architecture implementing a virtualization layer enabling a virtualized computing environment in accordance with the prior art;

FIGS. 1(e) and 1(f) illustrate a computer system architecture highlighting several of the deficiencies in implementing non-hardware acceleration-assisted network I/O operations in the virtualized computing environment of FIG. 1(d) in accordance with the prior art;

FIG. 2(a) illustrates a computer system architecture for implementing zero-copy network I/O receiving operations in a virtualized computing environment according to one embodiment of the present invention;

FIG. 2(b) illustrates a computer system architecture for implementing zero-copy network I/O sending operations in a virtualized computing environment according to one embodiment of the present invention;

DETAILED DESCRIPTION OF THE INVENTION

Figure 2C:
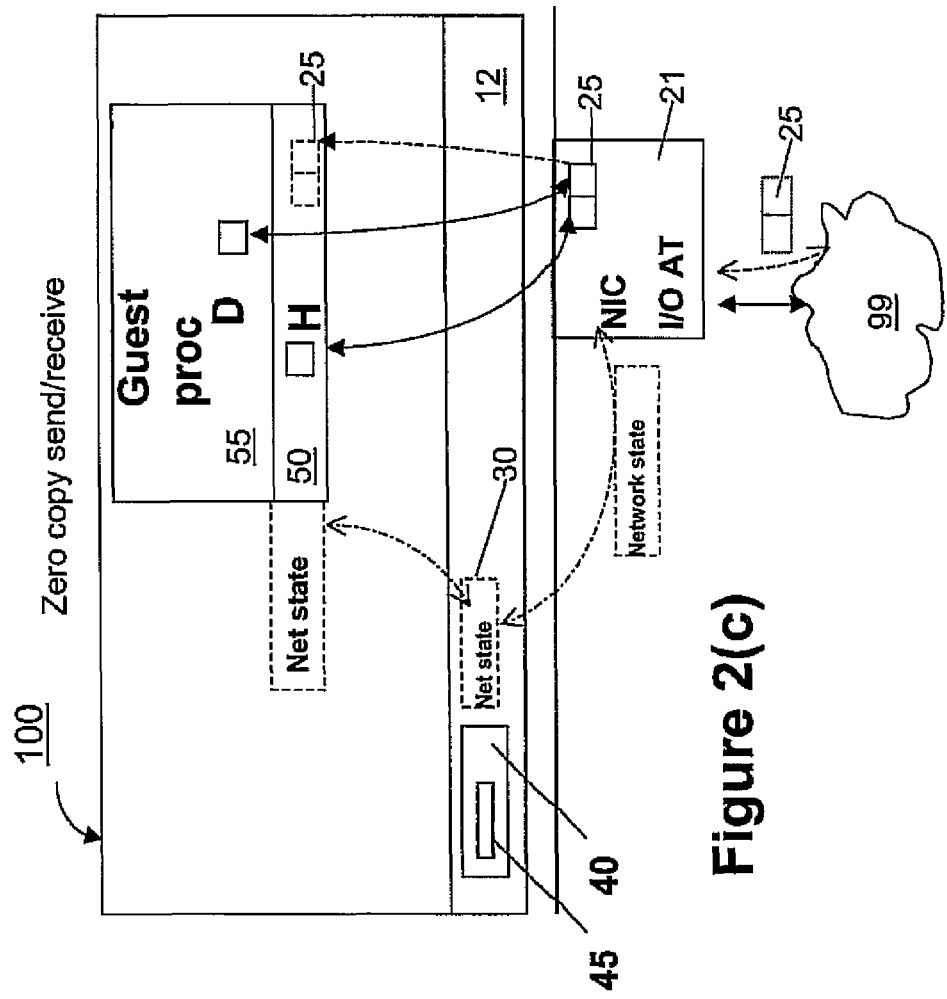
FIG. 2(c) illustrates a variation of the computing system architecture implementing zero-copy network I/O send and receive operations in a virtualized computing environment that implements network I/O hardware device acceleration-assisted technology according to the present invention.

FIG. 2(*a*) illustrates a computer system architecture for implementing zero-copy network I/O receiving operations in a virtualized computing environment according to one embodiment of the present invention. As shown in FIG. 2(*a*), the host operating system (O/S) 12, which may include a Linux O/S and its variations, or a Windows® operating system and implements virtualization layer 40, includes enhancements 45 comprising computer readable instructions, data structures, program modules and application interfaces that enable the host O/S to emulate network I/O hardware acceleration-assist technology. These enhancements significantly improve network performance of virtualized environments whether implemented in a stand-alone computer system or, as part of a distributed computer system. Such virtualized applications or processes 55 may include, but are not limited to: web-browsers, streaming media players, database or middleware programs, email (mail servers), ftp servers, web servers, database servers, multimedia servers, and electronic transaction systems executing under control of a different guest operating system (O/S) 50 such as Windows or Linux, for example.

Assuming that the guest O/S is aware of the virtualized accelerated TCP or like network I/O hardware acceleration-assist technology, the computer readable instructions, data structures, program modules and application interfaces 45 enable the host O/S to perform the necessary virtual memory address translations enabling the host O/S network stack to access the socket buffer (or the user space buffer) of an executing process inside the guest O/S, including delivering data directly to the socket buffer in the case of receiving data or, removing data placed at the socket buffer by the guest process when sending data. In the embodiment depicted in FIG. 2(*a*), the NIC network interface controller device 20 is not provided with accelerated network I/O hardware assist technology such as accelerated TCP (IOAT) or the like.

For example, as shown in FIG. 2(*a*), in the case of zero-copy network receive, the packet header portion (H) will be delivered directly to a kernel buffer in the guest operating system, so the guest O/S can verify that the data (D) arrived correctly and that the corresponding guest process 55 can get access to it. To accomplish this, the host O/S 12 receives a sub-set of network state information 30 from the guest process that provides the location of the virtual address of the target guest process that is to receive packets. Such state information 30 that may be maintained at the host O/S, may include, but is not limited to: source IP addresses, source port numbers, destination IP addresses, destination port numbers, expected packet sequence numbers and byte offsets, and, the corresponding physical memory addresses where headers and data should go for the aforementioned (source, destination, byte offset) tuple. Such state information may additionally include a protocol type (TCP, UDP, . . . ) or protocol type (IP, IPv6, . . . ), a TTL (time to live) value, a security label (for labeled ipsec networking), etc. Availability of such state information permits the host 0/S to analyze the header portion of an arrived packet 25, apply firewall rules, and, subject to any firewall rules applied by the host O/S, determine a virtual memory address associated with a target guest process 55 that is to receive the network packet data payloads.

FIG. 2(*b*) illustrates a computer system architecture 100 for implementing zerocopy network I/O sending operations in a virtualized computing environment according to one embodiment of the present invention. In the embodiment depicted, the NIC card 20 is not provided with accelerated TCP (TSO) or like network I/O hardware acceleration-assist technology. As shown in FIG. 2(*b*), the host O/S 12, or, in addition, the virtualization layer software 40, is provided with enhancements 45 (e.g., computer readable instructions, data structures, program modules and application interfaces) that emulate the performance of TCP acceleration or like network I/O hardware acceleration-assist technology. Such computer readable instructions, data structures, program modules and application interfaces enable the host OS network to perform the necessary virtual memory address translations, to be described in greater detail hereinbelow, enabling the host O/S to retrieve a data (D) payload directly from a guest process 55 hosted by a guest O/S and retrieve a packet header portion (H) directly from a kernel buffer of the associated guest O/S 50 and accordingly assemble one or more packets or packet segments, depending upon the size of the payload. In further embodiments, the host O/S may retrieve a whole network packet assembled by the guest operating system. Once a packet is assembled at the host O/S 12 or retrieved by the host O/S, the host O/S forwards the packet 25 to the NIC card for communication over network 99. As in the case of zero-copy network I/O receive operations, host O/S (or alternatively, the virtualization software) may maintain a sub-set of network state information 30 associated with guest processes to provide the host O/S with virtual address locations of guest processes which are the sources of network packet payloads. Alternately, the NIC card itself may copy the data and header from memory, with the host O/S only intervening to examine the header for compliance with any firewall rules and perform the address translation for the data. In this instance, the host O/S never actually needs to copy the data itself.

FIG. 2(*c*) illustrates a variation of the computing system architecture implementing zero-copy network I/O send and receive operations in a virtualized computing environment according to a further embodiment of the present invention. In the embodiment depicted in FIG. 2(*c*), the NIC card 21 is provided with hardware-accelerated TCP (TSO) or like network I/O hardware acceleration-assist technology. Thus, as shown in FIG. 2(*c*), for zero copy receiving, when the guest O/S is aware of the virtualized network I/O hardware acceleration-assist technology, the host O/S 12 maintains a subset of the network state information 30 associated with the guest O/S. Additionally, the NIC hardware 21 itself may be provided, via the host O/S, with the subset of the network state information 30 associated with the guest O/S. Thus, the NIC hardware 21, without intervention by the host O/S, is enabled to directly deliver the header portion (H) of the arrived packet 25, subject to application of firewall rules, to the kernel buffer in the guest O/S 50. The host O/S may perform an address translation to determine a physical memory address associated with a target guest process 55 which may also directly receive the network packet data payload from the NIC hardware 21.

For the case of zero copy receive, it should be understood that the network interface card 21 may be programmed with firewall rules that permit delivery of data, i.e., the NIC card 21 is instructed that it can copy some subset of the data to processes. Other types of data, where applied firewall rules will prevent delivery, will not be programmed into the NIC. If there is no firewall rule for a particular types of data, the host O/S will first receive the packet header where it will check for a firewall rule that may apply.

It should be understood that, by virtue of sharing some state information between the guest O/S and the NIC card 21, via the host, packets for a particular IP address may only be directly placed in a guest O/S kernel buffer location if the guest O/S is not aware of the capabilities of the hardware accelerated network I/O technology of a network card. Thus, a whole data packet including the header and data portions may be delivered by the NIC card 21 directly to a buffer location within the guest O/S without intervention of the host O/S. Subsequently, the guest O/S will determine to which process and where in its virtual memory space the data portion of the network packet is to be placed.

As further shown in FIG. 2(*c*), as in the case of zero copy send in a non-virtualized environment, the sending guest process 55 places a data payload in virtual memory and the guest O/S 50 prepares one or more network packet header(s), each corresponding to part of the payload. The host O/S informs the hardware-assisted NIC 21 to directly retrieve the data (D) and header (H) portions and assemble network packets, each specified by a header and part of the payload in a manner similar to the zero copy send in non-virtualized environments for communication over the network 99. Thus, the NIC hardware 21, without intervention by the host O/S, is enabled to directly copy the header (H) and data (D) portions of a packet 25 to be sent, subject to application of firewall rules. The host O/S will only need to examine the header (and possibly modify it for firewall rules) and perform an address translation for the data without actually needing to copy the data itself.

Figures 3A, 3B:
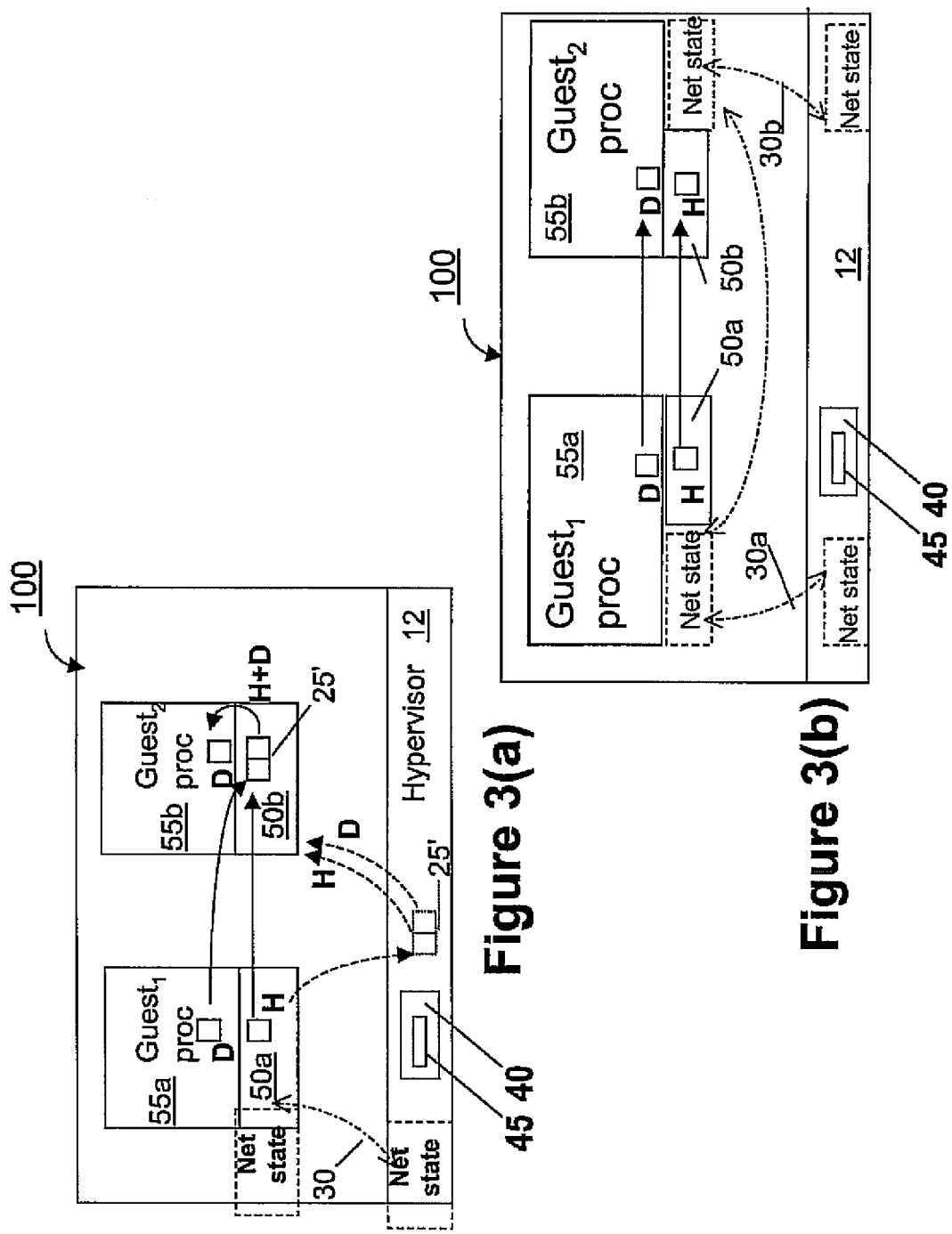
FIGS. 3(a) and 3(b) illustrate variations of the computing system architecture implementing zero-copy network I/O send and receive operations in a virtualized computing environment according to another embodiment of the present invention FIG. 4 describes the methodology 200 for performing address translations that enable zero-copy network I/O (sending and receiving) operations in virtualized environments according to the invention.

FIGS. 3(*a*) and 3(*b*) illustrate variations of the computing system architecture implementing zero-copy network I/O send and receive operations in a virtualized computing environment according to a further embodiment of the present invention. In the embodiment depicted in FIG. 3(*a*), "virtual" network packets are delivered to guest processes in the same machine, e.g., from a first guest process 55*a* operating in a first virtual machine (operating under control of guest O/S 50*a*) to the host O/S of the computing system, or to a second guest process 55*b* in a second virtual machine of the computing system (operating under control of guest O/S 50*b*). In the case of FIG. 3(*a*), where guest O/S 50*a* is aware of the use of emulated network I/O hardware acceleration-assist technologies (i.e., is zero copy sender aware), and the second guest O/S 50*b* is not, the host O/S 12 performs the necessary virtual memory address translations enabling it to directly copy the virtual network packet header from one guest O/S 50*a* and the data directly from the guest process 55*a*, into the kernel buffer of the second guest O/S 50*b*, subject to the application of firewall rules, where it is processed as a received virtual network packet 25. In a further copy step, the receiving guest O/S 50*b* copies the data portion directly into the second guest process 55*b* associated with the second guest O/S; however, one memory data copy performed by the O/S has been eliminated.

As firewall rules are applied before anything is done with the network packet, as shown in FIG. 3(*a*), this may involve synching of network state information 30 associated with the sending guest process 55*a* between the guest O/S 50*a* and the host O/S 12, just as network state information is synched between the host O/S and a network card having I/O hardware assist. The guest O/S 50*a* functioning to send packets first creates a packet header and instructs the virtual network card, in effect, the host O/S, to copy data together with the packet header which to form a virtual network packet that is sent to the second guest O/S 50*b* kernel buffer location.

It should be understood that, in the alternate scenario (shown in FIG. 3(*a*)), where the sending guest O/S is not zero copy sender ware, but the second receiving guest O/S is aware of emulating network I/O hardware acceleration-assist technology (i.e., is zero copy receiving aware), the host O/S 12 will retrieve a whole assembled virtual network packets in its own memory. At that point the enhanced host O/S 12 may copy the header portion (H) from the assembled packet to receiving guest O/S 50*b* at a location separate from where the data (D) is copied, i.e., the data is copied directly to the receiving guest process 55*b* socket buffer and the header is copied directly to the receiving guest O/S 50*a*, thus, eliminating a data copy operation in the process.

In the case of FIG. 3(*b*), where both guest O/Ses 50*a*, 50*b* are aware of the use of network I/O hardware acceleration-assist technologies (are respectively zero-copy sending and zero-copy receiving aware), the host O/S 12 performs the necessary virtual memory address translations enabling it to directly copy the header (H) from one guest O/S directly to the second guest O/S, subject to the application of firewall rules, and subsequently copy the data (D) directly from the first guest process 55*a* directly into the second socket buffer of the second guest process 55*b* associated with the second guest O/S 50*b* using the host O/S and virtualization software enhancements described herein. Particularly, in FIG. 3(*b*), the host operating system reads the packet header and it checks the destination which is the second guest process in the same physical machine that is zero copy receive aware. At that point, the host O/S 12 performs the direct copying of the virtual network packet from one guest O/S directly to the second guest O/S. This constitutes a single copy operation as opposed to the prior art described in FIG. 1(*g*). With respect to the application of firewall rules, as shown in FIG. 3(*b*), this embodiment performs a synching of network state information 30*a* between the first guest O/S 50*a* and the host O/S 12, and synching of network state information 30*b* between the second guest O/S 50*b* and the host O/S 12.

Figure 4:
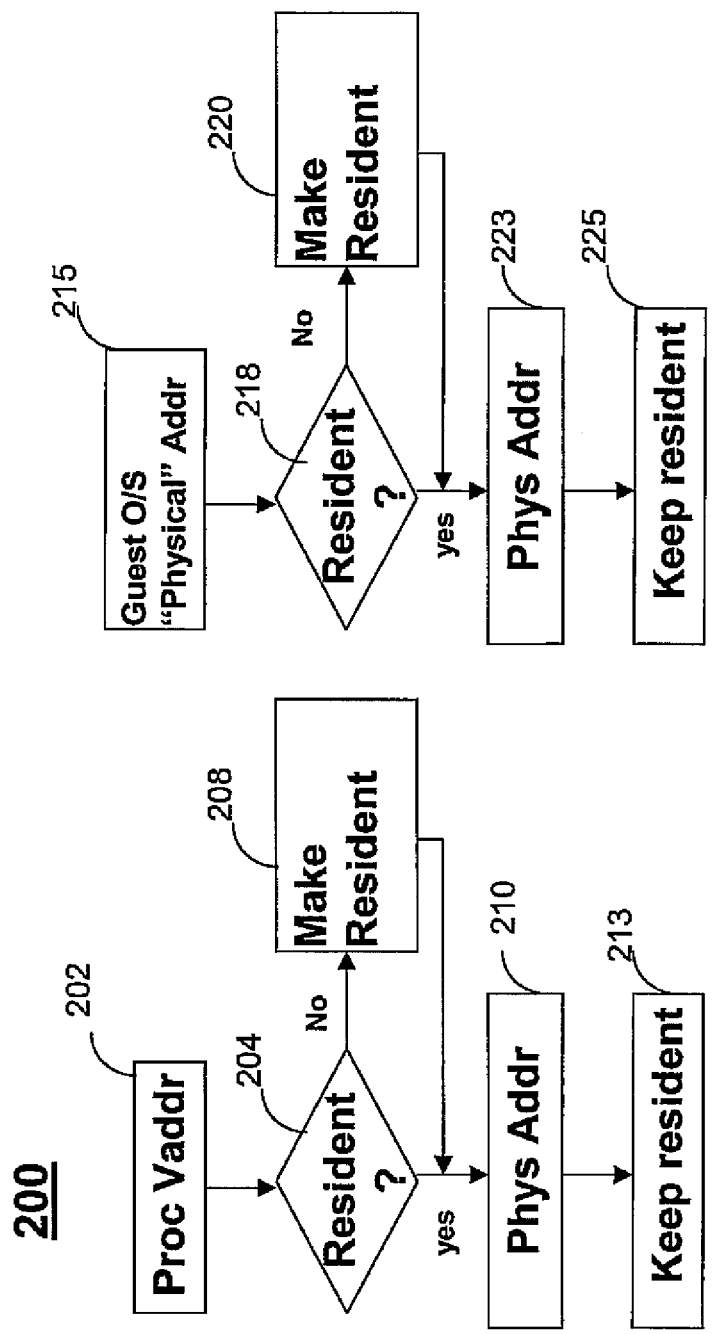

FIG. 4 describes the methodology 200 for performing address translations that enable zero-copy network I/O (sending and receiving) operations in the virtualized environments 100 of FIGS. 2 and 3. In the virtualized environments 100 of FIGS. 2 and 3, a virtual machine (guest O/S 50) lives in virtual memory and has a different idea about physical memory addresses than the physical machine (host O/S 12). Therefore, the host O/S needs to convert those addresses transparently. For example, what the guest O/S thinks of inside a virtual machine as being a physical memory address is, in reality, a virtual memory address which may not have any physical memory on the host O/S representing it; and what the guest O/S thinks is a particular piece of memory of its own, may actually be copied at the disk and not be represented by physical memory. That is, the guest virtual machine may think a page is resident in memory, while the host O/S may have this memory paged out to disk. Thus, for a network card, or any other device on the system to access the memory, it needs to live in physical memory, or is made "resident" before the device can write data to the right location. Moreover, the method of hardware-accelerated TCP or like network I/O hardware acceleration-assist technology may be different between what the guest O/S thinks and what the hardware really does, and thus, the host O/S needs to compensate for that. For example, for the non-hardware assist NIC in the embodiment of FIG. 2(*a*), the hardware is not performing any TCP acceleration at all, in which case the host O/S receives all network packets and then writes the data directly to the right locations inside the guest, i.e., directly to the guest process 55 socket buffer saving one extra copy of the data in the process.

As shown in FIG. 4, the virtual address 202 of a socket buffer in virtual memory that is associated with the guest process 55, and in which the host O/S accesses when emulating hardware-accelerated TCP or like network I/O hardware acceleration-assist technology for sending and receiving data, needs to be first translated into what the guest O/S thinks is a physical address. This requires determining at step 204 whether, from the perspective of the guest O/S, the virtual address is resident in virtual memory space of the guest O/S. If the virtual address is not resident from the perspective of the guest O/S 50, the address is made resident at step 208 which may be accomplished using virtual memory management techniques implementing address translation tables, as well known to skilled artisans. Once the virtual address associated with the guest process is made resident, i.e., is translated to a physical memory address from the perspective of the guest O/S at step 210, a further step 21 3 is implemented to ensure that this address remains resident from the perspective of the corresponding guest O/S 50. It is understood that steps 202-213 of FIG. 4 are performed by the guest O/S. Continuing to step 215, the physical memory address from the perspective of the guest O/S determined at step 210, in turn, needs to be translated into the actual physical address in hardware accessible by the host O/S. This requires determining at step 218 whether, from the perspective of the host O/S 12, the guest physical memory address is resident in the computing system's physical memory. If the guest physical address is not resident from the perspective of the host O/S 12, the address is made resident at step 220 which may be accomplished using standard O/S memory management techniques well known to skilled artisans (e.g., paging from disk). Once the virtual address associated with the guest process is made resident in physical memory, i.e., is translated to a physical memory address from the perspective of the host O/S at step 223, a further step 225 is implemented to ensure that this address remains resident from the perspective of the host O/S 12 until the data is received at the virtual memory address for the guest O/S. It is understood that the steps 215-225 of FIG. 4 are performed by enhancements to the host O/S in conjunction with executing virtualization software. Thus, due to the awareness (i.e., persistent connection) between applications at both the guest and host, the guest O/S may inform the host O/S details of the guest applications. The host O/S may additionally inform the NIC card 21 if it supports hardware accelerated TCP or like network I/O hardware acceleration-assist technology to perform the individual header and data copies (and packet assembly), or, will itself perform the individual header and data copies and packet assembly if the NIC hardware does not support hardware accelerated network I/O operations.

As described herein, the network packet payloads are delivered, either by the host O/S emulating hardware-accelerated TCP or like network I/O hardware acceleration-assist technology, subject to the firewall rules, directly from a kernel buffer location of the host O/S to a destination address in virtual memory representing a socket buffer of a destination process of a guest virtual machine, and, likewise, may be copied directly from a socket buffer address in virtual memory associated with a source process of a guest O/S to the host O/S. That is, the software implements a solution to the problem of ensuring residency in physical memory of a virtual address location to enable direct host O/S access to a guest process socket buffer.

Figure 5:
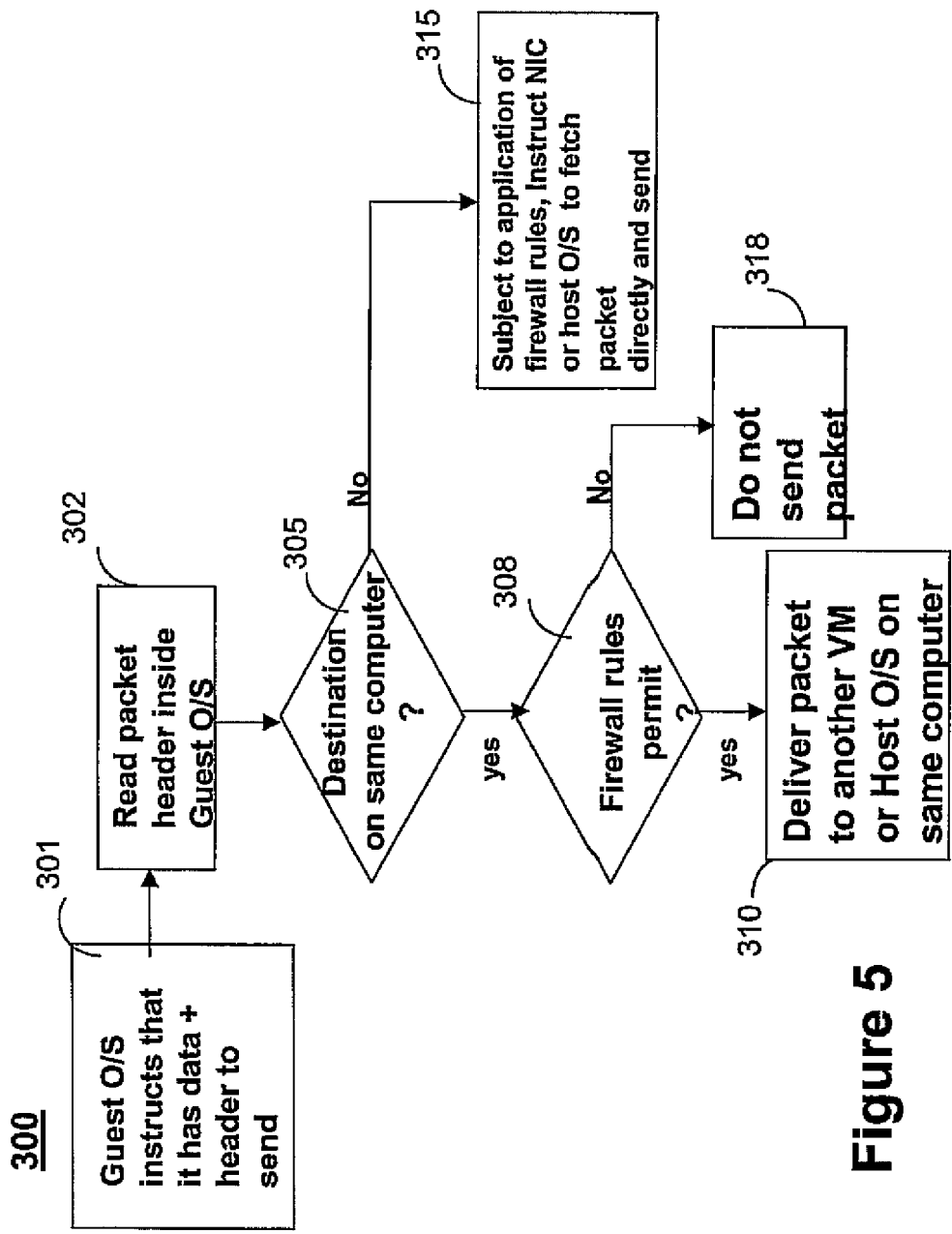
FIG. 5 depicts in greater detail, the zero copy network I/O send methodology for operation in virtualized environments, according to the invention.

Referring now to FIG. 5, there is depicted in greater detail, the zero copy network I/O sending operation in virtualized environments, according to the invention. At step 301, there is depicted the first step of a guest O/S getting instructions to send network data. This entails the guest operating system informing the host O/S emulating hardware accelerated TCP or like network I/O hardware acceleration-assist technology that it needs to send a network packet consisting of a header and data portions. It is understood that the data and the header could be either in memory next to each other or in the case the guest O/S has assembled the network packet; or it could be disjoined in memory where the data and the header live in different places in virtual memory. For example, if the guest O/S is not zero copy sender aware, the guest O/S will create a network packet in its own memory, and inform the host O/S in an attempt to send the packet through a virtual network interface. The host O/S may first perform the virtual address translation steps 215-225 of FIG. 4 to obtain the physical address location (in system physical memory) of the header portions and will look at the packet header inside the guest O/S as indicated at step 302. Then, at step 305, the host O/S will make a determination of whether the packet destination is for another guest process resident on the same computer, or is to be sent over the network. If the destination of the packet is on the same computer, then, subject to application of firewall rules at step 308, the packet is delivered onto another virtual machine on the same computer or to the host O/S itself as indicated at step 310 and described in detail with respect to FIG. 6. If, at step 305, it is determined that the destination is not for a process executing on the same physical computer, then the following is performed: 1) if the network interface card implements network I/O hardware acceleration-assist technology (FIG. 2(*c*)), and as network state information is synched between the host O/S and the NIC card, the NIC device is instructed by the host O/S to directly copy the packet and send it out over the network, as indicated at step 315. It is understood that this operation is subject to the necessary application of firewall rules. In this instance, the host O/S will only need to examine the header (and possibly modify it for firewall rules) and perform an address translation for the data without actually needing to copy the data itself. If the network interface card does not implement accelerated network I/O hardware assist technology (FIG. 2(*b*)), the enhanced host O/S will send packets by first retrieving the packet header, applying the firewall rules, copy the data from the guest process and together with the packet header assemble a network packet 25. In both cases, the host O/S only needs to view the destination address of the packet and apply the appropriate firewall rule. If, at step 308, the firewall rules applied by the host O/S indicate that the packet is not allowed to be sent, the packet is either not sent, as indicated at step 318, or is subject to further processing as will be described in greater detail herein.

Figure 6:
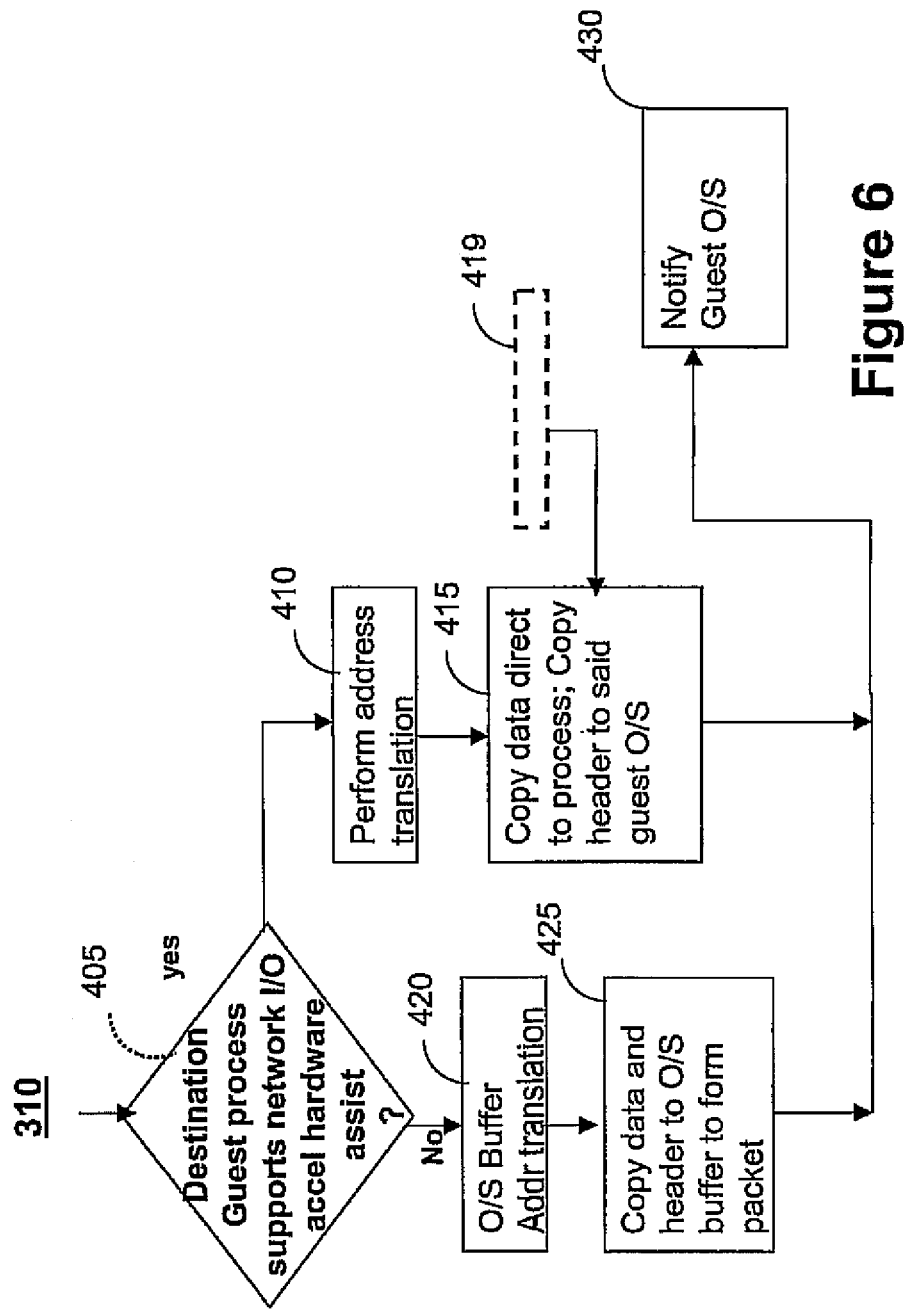
FIG. 6 depicts in greater detail, the operations performed in step 310 of FIG. 5, which is the step of delivering virtual network packets to virtual machine processes in the same physical computing system.

FIG. 6 illustrates step 310 of FIG. 5 in greater detail, which is the step of delivering virtual network packets in the same machine, e.g., from a first guest process in a first virtual machine to the host O/S, or to a second guest process in a second virtual machine. For the case of software delivery to another virtual machine executing in the same physical computer, a determination is first made at step 405 whether the destination guest process is zero-copy receive aware (i.e., supports emulated network I/O hardware acceleration-assist technology). If it is determined that the destination guest process is not zero-copy receive aware, then as indicated at step 420, address translations are performed as in FIG. 4 so that the data at the sending guest process and header at the sending guest 0/5 are copied directly to the host 0/S operating system, as indicated at step 425. Then, at the host 0/S, the virtual network packet is formed at step 420 and the receiving guest 0/S is notified that it has received the network data, and subsequently can directly copy the assembled virtual network packet to the guest 0/S as indicated at step 430. Otherwise, as determined at step 405, if the destination guest process is zero-copy receive aware, then, as indicated at step 410, address translations are performed so that the data be directly copied to the process of the destination guest process and the header be directly copied to the guest 0/S as indicated at step 415. Then, at step 430, the receiving guest 0/S is notified that has received the network data.

According to a further aspect of the invention, when for emulating network I/O hardware acceleration-assist technology, an additional performance optimization is enabled in the treatment of the checksum operations that are performed. Typically, inside the network packet is the checksum of the data in the packet. To verify that things are correct on the receiving process, what some smart network cards currently do is allow the operating system that is sending the data to not put the checksum in at all, and instead, the smart network card computes the check sum for the operating system, obviating the need for the operating system to run the checksum computations. In the present invention, it is the case that the host 0/S can pretend to the sending zero-copy sending aware guest process, e.g., guest 0/S 50a in FIGS. 3(a) and 3(b), that it performs the check summing in the virtual emulated hardware. Likewise, on the receiving side, the host 0/S can pretend to the receiving guest operating system that is zero-copy receiver aware, e.g., guest 0/S 50b in FIGS. 3(a) and 3(b)), that it performs the check summing in the virtual emulated hardware. As a result, the check summing operation performed by the virtual network card, i.e., the enhanced host 0/S, may be altogether omitted, because both the sending and receiving guest 0/Ses think that the emulated hardware is doing the check summing. Thus, if the sending guest 0/S trusts the emulated hardware to generate the checksum, and the receiving guest 0/S trusts the emulated hardware to check the checksum, then the checksum operation is skipped, as indicated at an omitted step 419, in FIG. 6.

Thus, in virtualized environments implementing I/O hardware acceleration-assist checksum switch emulations, a guest 0/S may instruct the emulated hardware to perform the checksumming for it; and for the case of the data being sent over the network, two things could happen: 1) either the network interface card knows how to do the checksumming, and host 0/S will inform the network card to retrieve the data and the header from the memory, and perform the checksumming; or, 2) the host 0/S will perform the checksumming if the hardware cannot do it itself. However, if the data is for another virtual machine in the same computer, as a memory to memory copy on a PC is reliable, in that case, the checksumming can be avoided all together only if the receiving guest 0/S trusts the host 0/S, i.e., trusts the emulated acceleration hardware assist, to perform the checksumming operation for it. Furthermore, in case of sending through network hardware that does perform the checksumming, in that case, neither the host 0/S nor the guest 0/S needs to perform checksumming. By having the host 0/S present in the emulated hardware indicate that it performs the check summing, the guest 0/S does not perform the checksumming. If the hardware does not support checksumming, the host 0/S simply has to perform the checksumming for the guest 0/S for packets that are to be sent over the network external to the computer. If the network card does checksumming, then neither the guest 0/S nor the host 0/S need to do check summing because it is performed in hardware. By having the guest 0/S optimistically assume that another entity (e.g., the host 0/S) will take care of checksumming, then, according to the invention, that checksumming step can be skipped altogether.

In achievement of this performance optimization, it is understood that a guest 0/S indicates that it is aware of the zero copy network I/O hardware assist emulations at the host 0/S according to the invention by an option that a device driver inside the guest 0/S that talks to the virtual hardware or host 0/S may switch on. Alternately, it is a virtual interface software construction, or it could be a flag or it could be an attribute of the virtual machine, which is the guest.

Figure 7A:
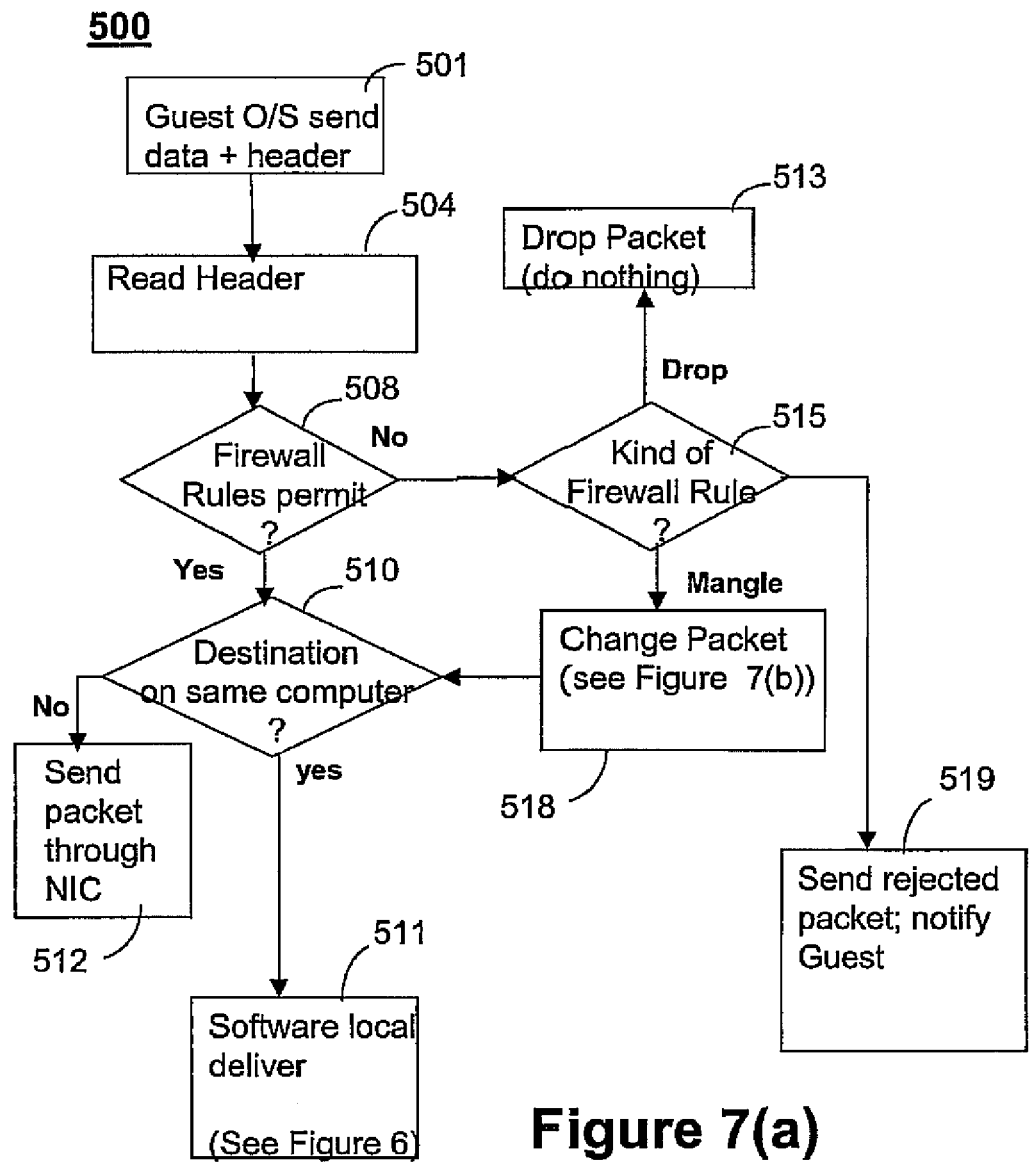
FIG. 7(*a*) depicts the application of firewall rules to packets communicated in virtualized environments according to the zero copy network I/O optimizations according to the invention; and, FIG. 7(*b*) depicts in greater detail the "mangle" operations applied to a network packet in the zero copy network I/O operations in virtualized environments, according to the invention.
Figure 7B:
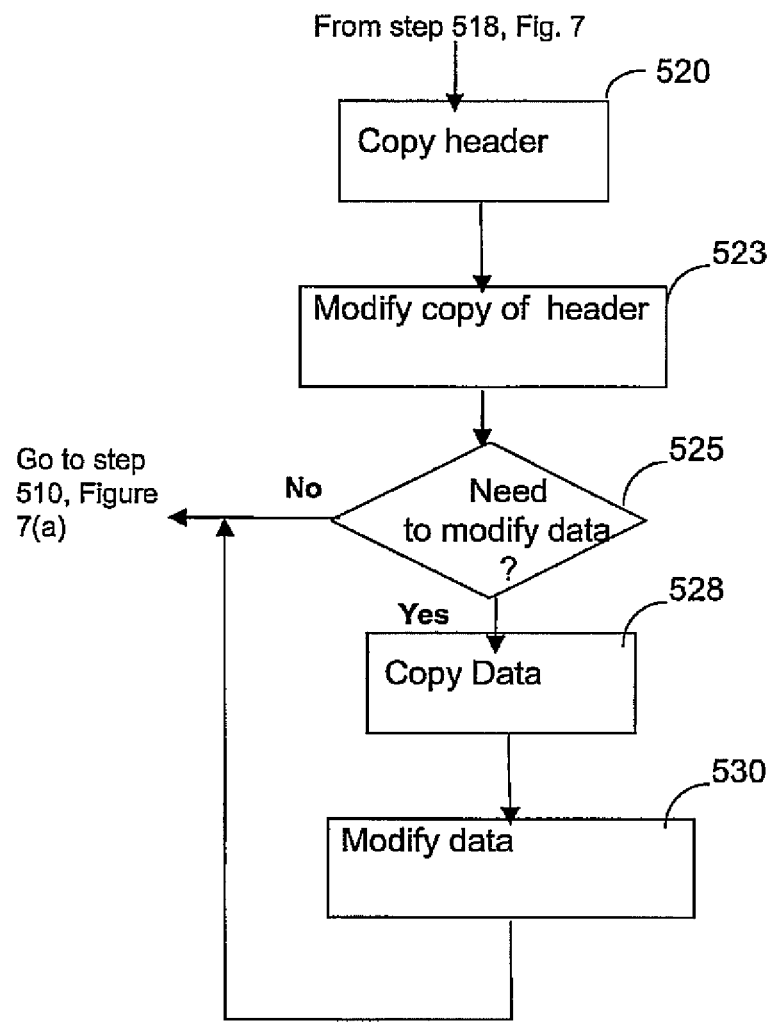

FIG. 7(a) depicts in greater detail the methodology 500 for applying firewall rules in the zero copy network I/O operations in virtualized environments, according to the invention. As shown in FIG. 7(a), step 501 the guest operating system instructs the virtual network interface to send a network header and data. At step 504, the host 0/S reads the header and performs a check at step 508 if the packet is allowed by firewall rules. If the packet is allowed by firewall rules, then a check is performed at step 510 to determine if the packet destination is on the same computer. If the packet destination is on the same computer, then the local packet delivery is performed as described in greater detail herein with respect to FIG. 6. If the packet destination is not on the same computer, then a network packet is delivered through the network interface card. Returning at step 508, if it is determined that the packet is not permitted through by the firewall rules, then a further check is made at step 515 as to the kind of firewall rule that needs to be applied to the packet. For example, as indicated at step 513, the packet could be dropped. Alternately, as indicated at step 518, there may be application of a "mangle" rule, which indicates in Linux parlance that the packet is to be changed in some way, e.g., change the packet header. For example, as shown in FIG. 7(b), which represents the Linux "mangle" operation, a first step comprises copying the packet header from the guest 0/S into the host 0/S as indicated at step 520 and modifying the header as indicated at step 523. Then, the network card is still taking data directly from the guest, a determination is made at step 525, as to whether data portion must additionally be modified. If the data portion does not have to be modified, the header with the original data will constitute the network packet to be delivered, and the process returns to step 510, FIG. 7(b). If at step 525, it is determined that the packet data has to be additionally modified, a copy of the data is performed at step 528 prior to modifying the data at step 530. With the packet and modified header and data portions to be delivered, the process proceeds back to step 510, FIG. 7(a), where at step 510 it is determined whether the packet is to be delivered locally, i.e., to another virtual machine executing on the same computing system where processing steps are implemented at step 511 in view of FIG. 6, or, to be delivered over the network as indicated at step 512.

Alternately, returning to step 51 5, it may be determined that the firewall to be applied is a reject packet rule, in which the rejected packet is not delivered, and the guest 0/S is notified at step 519 that the packet could not be sent.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

What is claimed is:

1. A method comprising:
receiving an indication of a network packet to be sent a destination, the network packet comprising a packet header indicating the destination and originating from a first virtual machine executing on a computer system;
determining, by a processor, whether the destination is a second virtual machine executing on the computer system in view of an examination of the packet header;
in response to determining that the destination is the second virtual machine, identifying a process in the second virtual machine that receives data from the network packet;
transferring the data from the network packet to the process; and
transferring the packet header to a guest operating system of the second virtual machine.

2. The method of claim 1, further comprising:
transferring the network packet to a network interface device in response to determining that the destination is not the second virtual machine.

3. The method of claim 1, wherein transferring the data from the network packet is performed by a host operating system executing on the computer system.

4. The method of claim 1, wherein transferring the data from the network packet comprises:
notifying a guest operating system of the second virtual machine of the network packet; and
transferring the network packet to the guest operating system.

5. The method of claim 1, further comprising:
notifying the first virtual machine and the second virtual machine that a check sum operation was performed on the network packet.

6. A system comprising:
a memory; and
a processor coupled to the memory and to:
receive an indication of a network packet to be sent a destination, the network packet comprising a packet header that indicates the destination and originates from a first virtual machine that executes on the system;
determine whether the destination is a second virtual machine that executes on the system in view of an examination of the packet header;
identify, in response to a determination that the destination is the second virtual machine, a process in the second virtual machine that receives data from the network packet;
transfer the data from the network packet to the process; and
transfer the packet header to a guest operating system of the second virtual machine.

7. The system of claim 6, wherein the processor is to transfer the data from the network packet to a network interface device in response to a determination that the destination is not the second virtual machine.

8. The system of claim 6, wherein the processor is to transfer the data from the network packet via a host operating system that executes on the system.

9. The system of claim 6, wherein to transfer the data from the network packet is to:
notify a guest operating system of the second virtual machine of the network packet; and
transfer the network packet to the guest operating system.

10. The system of claim 6, wherein the processor is further to notify the first virtual machine and the second virtual machine that a check sum operation was performed on the network packet.

11. A non-transitory computer readable storage medium comprising instructions that, when executed by a processor, cause the processor to perform operations comprising:
receiving an indication of a network packet to be sent a destination, the network packet comprising a packet header indicating the destination and originating from a first virtual machine executing on a computer system;
determining, by the processor, whether the destination is a second virtual machine executing on the computer system in view of an examination of the packet header;
in response to determining that the destination is the second virtual machine, identifying a process in the second virtual machine that receives data from the network packet;
transferring the data from the network packet to the process; and
transferring the packet header to a guest operating system of the second virtual machine.

12. The non-transitory computer readable storage medium of claim 11, wherein the operations further comprise:
transferring the network packet to a network interface device in response to determining that the destination is not the second virtual machine.

13. The non-transitory computer readable storage medium of claim 11, wherein transferring the data from the network packet is performed by a host operating system executing on the computer system.

14. The non-transitory computer readable storage medium of claim 11, wherein transferring the data from the network packet comprises:
notifying a guest operating system of the second virtual machine of the network packet; and
transferring the network packet to the guest operating system.

15. The non-transitory computer readable storage medium of claim 11, wherein the operations further comprise:
notifying the first virtual machine and the second virtual machine that a check sum operation was performed on the network packet.

* * * * *